Sept. 27, 1960 W. L. SHARP 2,953,856
COMBINED TAPER-MEASURING MACHINE AND LINEAR DIMENSION GAUGE
Filed Jan. 28, 1957 6 Sheets-Sheet 2

Inventor
William L. Sharp
By
Holcomb, Wetherill & Archer
Attorneys

Sept. 27, 1960 W. L. SHARP 2,953,856
COMBINED TAPER-MEASURING MACHINE AND LINEAR DIMENSION GAUGE
Filed Jan. 28, 1957 6 Sheets-Sheet 3
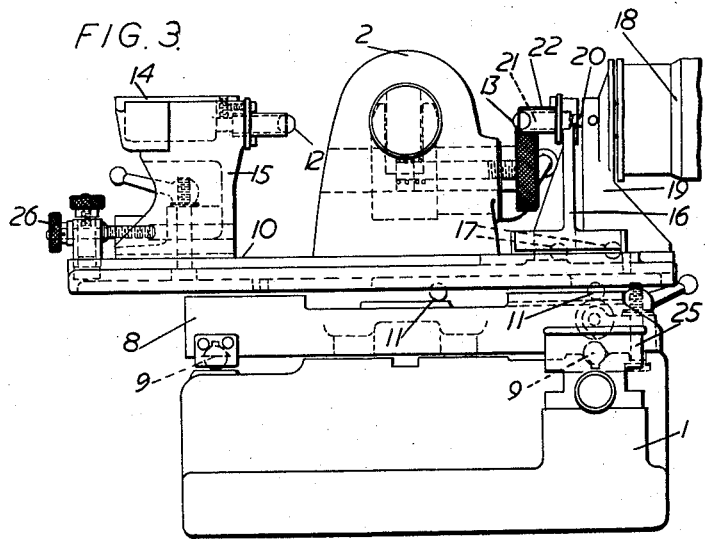
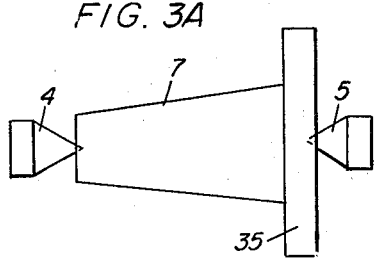
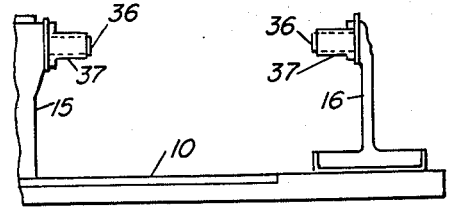
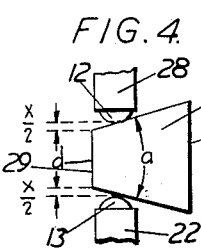
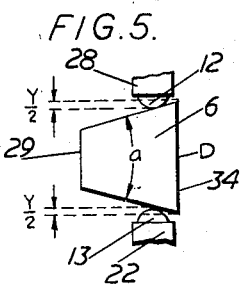
Inventor
William L. Sharp
By
Attorneys

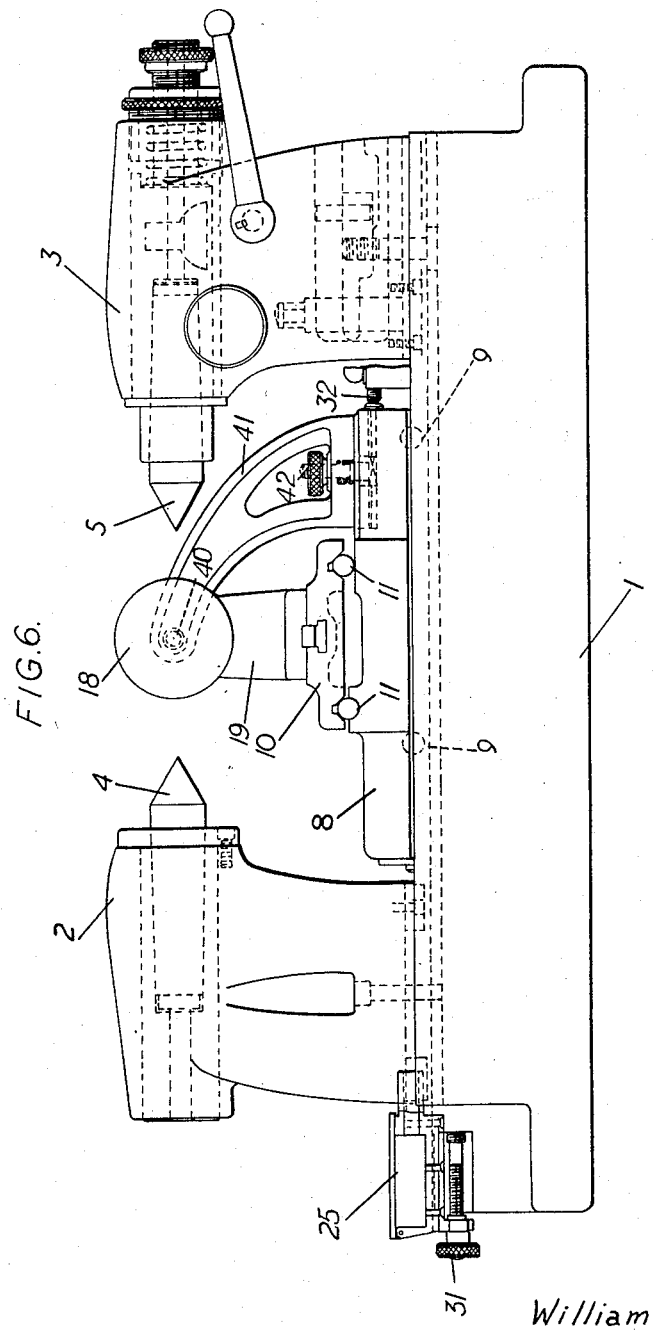

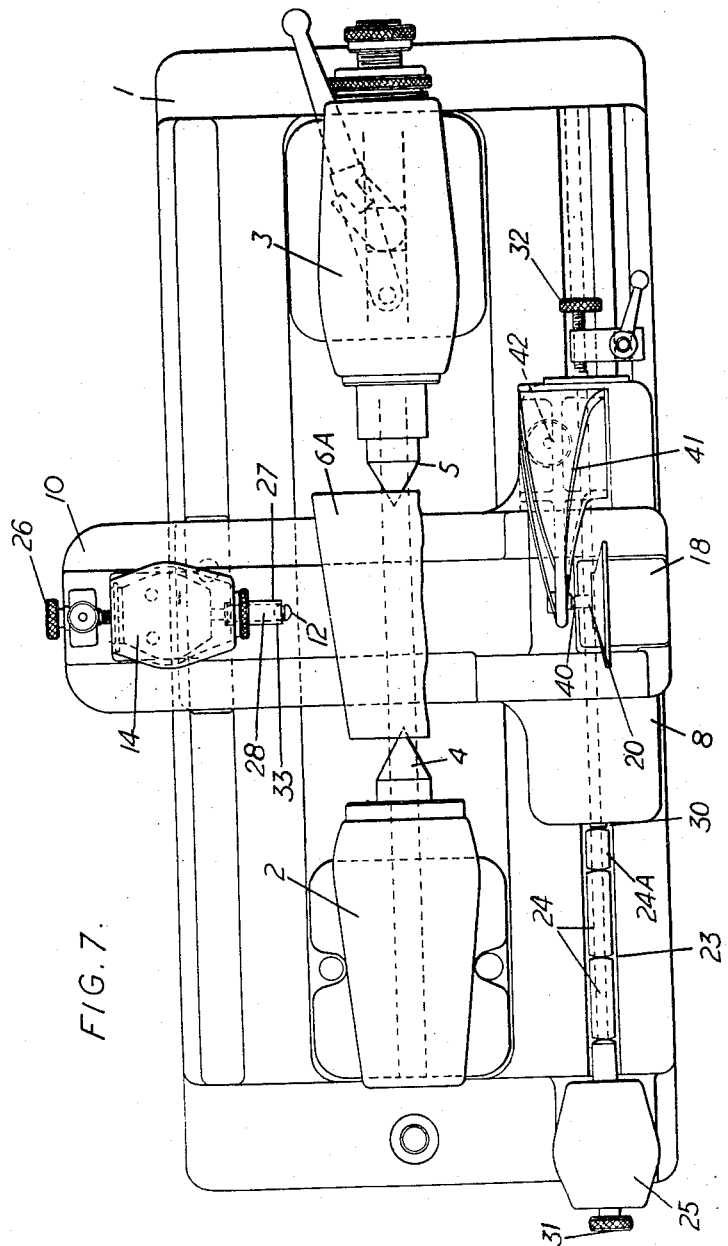

Sept. 27, 1960　　　　W. L. SHARP　　　　2,953,856
COMBINED TAPER-MEASURING MACHINE AND LINEAR DIMENSION GAUGE
Filed Jan. 28, 1957　　　　　　　　　　　　6 Sheets-Sheet 6
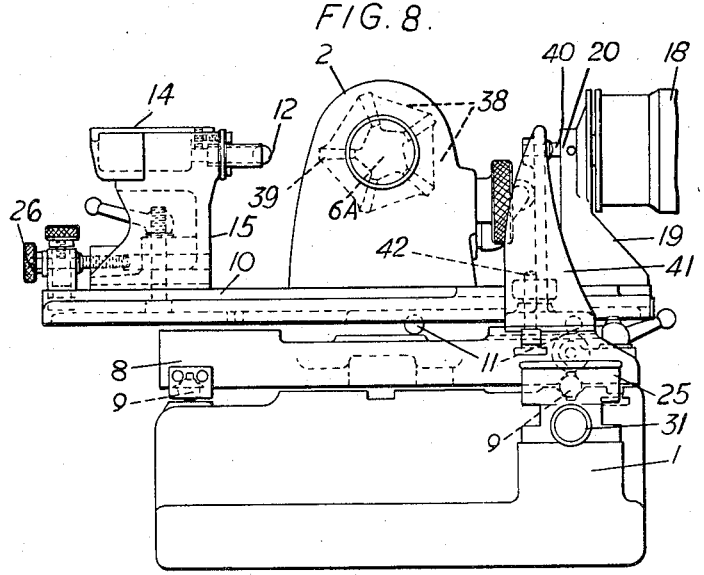
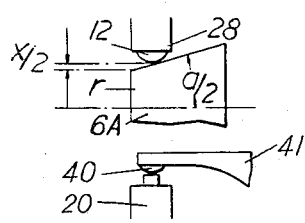
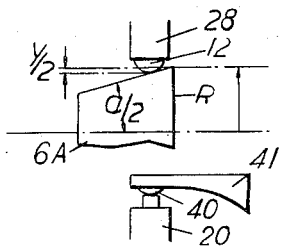
Inventor
William L. Sharp
By
Attorneys

United States Patent Office 2,953,856
Patented Sept. 27, 1960

2,953,856

COMBINED TAPER-MEASURING MACHINE AND LINEAR DIMENSION GAUGE

William L. Sharp, Coventry, England, assignor to Nuffield Tools and Gauges Limited, Coventry, England Filed Jan. 28, 1957, Ser. No. 636,758

Claims priority, application Great Britain Dec. 13, 1956

3 Claims. (Cl. 33—174)

This invention is concerned with a combined taper-measuring machine and linear dimension gauge constituting a precision measuring unit of unusually versatile character.

The improved measuring unit comprises a bed fitted with headstocks having centres between which the work-piece to be measured is held, a carriage mounted on balls for movement along the bed parallel to the axis of the centres, a slide supported by the carriage and mounted on balls for horizontal movement at right angles to the axis of the centres, a first contact device capable of being brought into engagement with one side of the work-piece, this contact device, together with an associated sensitive dial indicator, being supported on an adjustable mounting carried by the slide, a second contact device supported by the axially movable carriage; and a micrometer mounted on the side for co-operation with the second contact device.

In one arrangement of a measuring unit embodying the invention, the two contact devices mentioned above are disposed in accurate alignment and so that they can be brought into engagement with opposite sides of the work-piece; the second contact device is supported on a mounting which is carried by balls on the slide for horizontal movement at right angles to the axis of the centres; and the micrometer is mounted on the slide so that its spindle can be brought into working engagement with the mounting of the second contact device.

Although the particular arrangement just outlined results in a precision measuring unit of unusually versatile character, it cannot be employed to measure the taper of a tapered reamer or the like having an odd number of flutes, because when a land was engaged by one of the two contact devices there would inevitably be a gap (i.e. one of the flutes) opposite the other contact device. In order to cater for that eventuality the invention also comprises a modification according to which the above-mentioned second contact device, instead of being mounted for horizontal movement at right angles to the axis of the centres between which the work-piece is held, is mounted rigidly on the axially movable carriage to afford a fixed datum; the micrometer being mounted on the slide so that its spindle can co-operate with the second contact device to effect movement of the slide to bring the first contact device into engagement with the associated side of the work-piece. Its other side, of course, is not engaged at all when this modified arrangement is used.

Referring to the accompanying drawings:

Figures 2 and 3 show the unit in plan view and in end elevation respectively;

Figure 1:
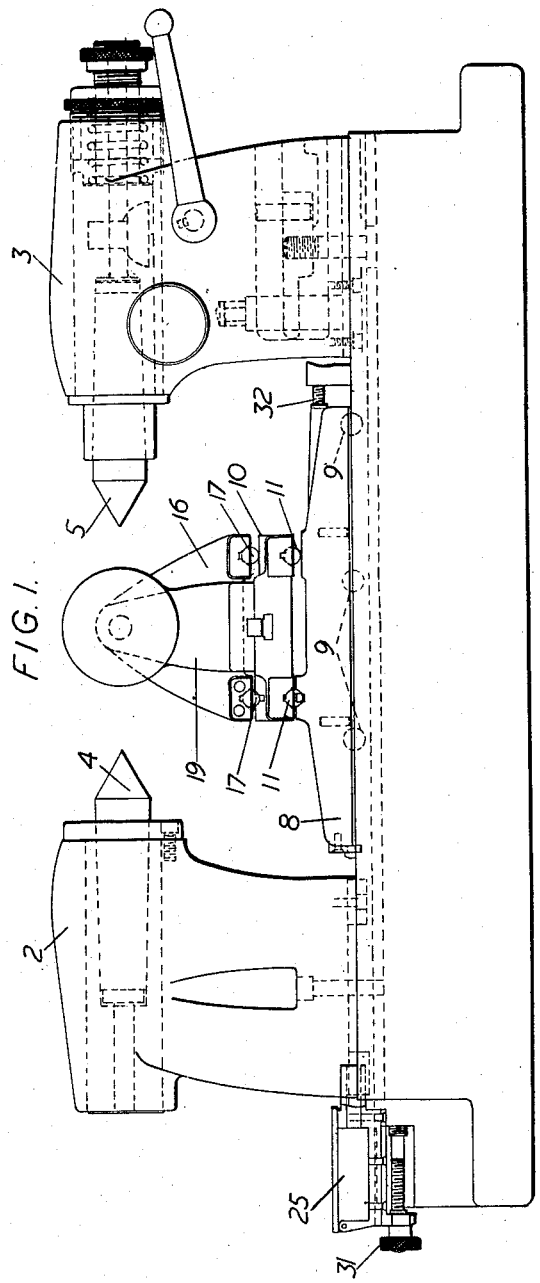
Figure 1 is a side elevation of one form of a combined taper-measuring machine and linear dimension gauge in accordance with the invention.

Figure 3A schematically shows a flanged workpiece engaged between the centers;

Fig. 3B illustrates the substitution of a flat anvil for the contact ball shown in Fig. 1;

Figures 4 and 5 illustrate diagrammatically the application of the unit to measurement of the diameters at the small end and large end respectively of a tapered work-piece;

Figure 6 is a side elevation of a modified form of a combined taper-measuring machine and linear dimension gauge in accoradnce with the invention;

Figures 7 and 8 show the modified unit in plan view and in end elevation respectively; and Figures 9 and 10 illustrate diagrammatically the application of the modified unit to measurement of the radii at the small end and large end respectively of a tapered reamer or the like having an odd number of flutes.

Figure 2:
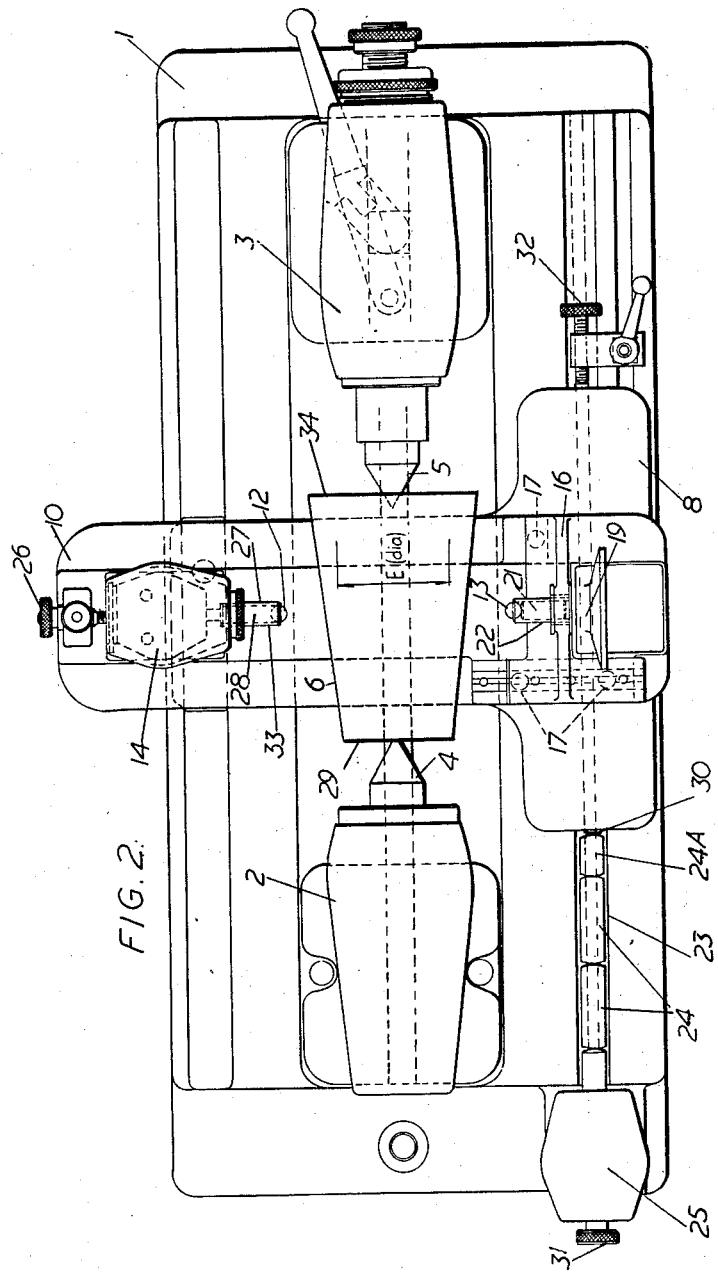

The measuring unit illustrated in Figures 1 to 3 has a bed 1 provided with fixed and loose headstocks 2 and 3 respectively, the work-piece of which the diameter or taper, as the case may be, is to be measured, being held between centres 4 and 5. A work-piece 6 in the form of a plain taper is indicated in Figure 2. A substantially T-shaped carriage 8, mounted on balls 9, is freely movable parallel to the axis of the centres 4 and 5. This carriage supports a slide 10 which is mounted on balls 11 for horizontal movement at right angles to the axis of the centres 4 and 5.

Contact balls 12 and 13, in accurate alignment, are arranged so that they can be brought into engagement with opposite sides of the work-piece. The contact ball 12, together with an associated sensitive dial indicator 14, is supported on an adjustable mounting 15 (Fig. 3) which is carried by the slide 10. The dial indicator 14 preferably has a total range not exceeding about ±0.003 inch, with scale graduations of 0.0001 inch, the make known by the brand name "Etalon" being very suitable for the purpose. The other contact ball 13 is supported on a mounting 16 which is carried by balls 17 on the slide 10 for horizontal movement at right angles to the axis of the centres 4 and 5. A micrometer 18 (shown in Figure 3, but omitted from Figures 1 and 2) reading direct to 0.0001 inch is mounted on a pedestal 19 fixed to the slide 10. The spindle 20 of this micrometer is engageable with a rod 21 fitted in a tubular holder 22 and lying against the contact ball 13.

A V-groove 23, provided in the bed 1 parallel to the axis of the centres 4 and 5, serves to receive length-gauge bars 24, 24A with which is associated a sensitive dial indicator of the same character as the dial indicator 14.

A master gauge disc (not shown), of whatever diameter is required (e.g. one inch, two inches and so on), is mounted on a mandrel between the centres 4 and 5. The micrometer 18 (Fig. 3) is then set to read zero, and the slide 10 moved to bring the contact ball 13 into engagement with the gauge disc. The other contact ball 12 is next caused to engage the gauge disc, by shifting the adjustable mounting 15, and the dial indicator 14 is thereupon set to read zero by using an adjusting screw 26 having a micrometer thread. The micrometer 18 will now cover the range from one inch to two inches or from two inches to three inches as the case may be, depending upon the size of the master gauge used. The mandrel is then removed, together with the master gauge, and the work-piece, for example the plain taper 6 (Fig. 2) is mounted between the centres 4 and 5.

By shifting the carriage 8, the side 27 of the tubular holder 28 for the contact ball 12 is brought to bear against the end face 29 of the taper 6. In the particular example under consideration the outside diameter of the tubular holder 28 is 0.5000 inch. The previously mentioned gauge bars 24, 24A of appropriate total length are placed in the V-groove 23 to make contact with a button 30 on the carriage 8, and the dial indicator 25 is moved into contact with the gauge bars and is set to read zero by adjustment of a screw 31 having a micrometer thread. A length of 0.500 inch is next added to the gauge bars 24, 24A and the carriage 8 is moved, by adjustment of a micrometer-thread screw 32, until the dial indicator 25 again reads zero. As a consequence of following this procedure the carriage 8 has been so located that the first reading on the micrometer 18 (Fig. 3) will be taken at a distance of 0.250 inch from the end face 29 of the taper 6.

Referring to Figure 4, the diameter $d$ which it is required shall obtain at the smaller end of the taper 6 is checked by adding to this prescribed diameter the dimension X defined in Fig. 4. The value of X is derived by calculation, as is also the value of Y (see Fig. 5), and a chart is prepared which not only gives these values for a whole range of tapers but also gives the angle $a$ in each case and the taper per unit length on the diameter.

The angle $a$ of the taper 6 is checked by adding a known length (say, three inches) to the gauge bars 24, 24A and resetting the dial indicator 25 to read zero by adjustment of the screw 32, after which a second reading is taken with the micrometer 18. By multiplying the taper per inch, derived from the chart, by three (i.e. the number of inches moved) the required difference between the first and second reading of the micrometer 18 is obtained.

In order to check the diameter D (see Fig. 5) at the larger end of the taper 6, the side 33 (Fig. 2) of the tubular holder 28 for the contact ball 12 is brought to bear against the end face 34 of the taper. The total length of the gauge bars 24, 24A is altered as necessary and the dial indicator 25 is set to read zero by adjustment of the screw 31. A length of 0.500 inch is then removed from the gauge bars 24, 24A and the dial indicator is again set to read zero by means of the adjusting screw 32. The initial reading of the micrometer 18 will then be taken at a distance of 0.250 inch from the end face 34 of the taper 6. The value of Y (see Fig. 5) given by the chart is subtracted from the prescribed diameter D.

With the contact balls disposed as indicated in Figure 5 the angle $a$ can be checked by removing a known length (for example three inches) from the gauge bars 24, 24A. The dial indicator 25 is then set to read zero by adjusting the screw 32, and a second reading is taken on the micrometer 18. The taper per inch, given by the chart, is multiplied by three (i.e. the number of inches moved) and the result subtracted from the first micrometer reading.

In a case of the flanged taper 7 (Fig. 3A) the diameter E at the base of the coned part can be checked by bringing the side 27 of the tubular holder 28 for the contact ball to bear against the face 35 of the flange, and then taking the first micrometer reading. The subsequent procedure is the same as described in the immediately preceding paragraph.

Male screw gauges can be measured by using appropriate wires, removing the mounting 16 complete with the contact ball 13 and its holder 22, and replacing the contact ball 12 and its holder 28 with a flat anvil 36 (Fig. 3B) mounted in a holder 37. Measurements are then taken between the end face of the anvil 36 and the end of the micrometer spindle 20.

Referring now to the modified form of measuring unit illustrated in Figures 6 to 8, the parts common to this and to the one already described are identified by the same reference numerals as used in Figures 1 to 3.

A work-piece 6A of which the taper is to be measured is indicated diagrammatically in Figure 7, and in Figure 8 is shown in dotted outline as being a tapered reamer having an odd number of flutes 38. As can be appreciated from Figure 8, when the work-piece 6A has one of its lands 39 presented for engagement by the contact ball 12 one of the flutes 38 is disposed at the opposite side, in the line of engagement, and consequently a gauging member can only be applied to one side of the work-piece. The problem is solved by the invention in that a fixed datum is established at the opposite side of the work-piece. This fixed datum is afforded by a contact button 40 on a bracket 41 which is detachably mounted on the carriage 8, the distance between the axis of the centres 4 and 5 and the face of the contact button 40 being a constant of the particular unit. By means of a clamping screw 42 the bracket 41 can be adjusted, parallel to the axis of the centres 4 and 5, to bring the contact button 40 into alignment with the spindle 20 of the micrometer 18.

A master gauge disc (not shown), of whatever radius is required (e.g. 0.5 inch, one inch and so on), is mounted on a mandrel between the centres 4 and 5. The micrometer 18 is then set to read zero, with its spindle 20 engaging the contact button 40. The contact ball 12 is next caused to engage the gauge disc, by shifting the adjustable mounting 15, and the dial indicator 14 is thereupon set to read zero by means of the adjusting screw 26. The micrometer 18 will now cover the range from 0.5 inch to one inch or from one inch to 1.5 inches as the case may be, depending upon the size of the master gauge used. The mandrel is then removed, together with the master gauge, and the work-piece 6A is mounted between the centres 4 and 5. The ensuing procedure is the same as already explained in connection with Figures 1 to 3.

Referring to Figure 9, the radius $r$ which it is required shall obtain at the smaller end of the taper 6A is checked by adding to this prescribed radius the dimension $$\frac{X}{2}$$

defined in Fig. 9. The value of $$\frac{X}{2}$$

is derived by calculation, as is also the value of $$\frac{Y}{2}$$

(see Fig. 10), and a chart is prepared which not only gives those values for a whole range of tapers but also gives the angle $$\frac{a}{2}$$

in each case and the taper per unit length on the radius. The angle $$\frac{a}{2}$$

of the taper 6A is checked by adding a known length (say, three inches) to the gauge bars 24, 24A and resetting the dial indicator 25 to read zero by adjustment of the screw 32, after which a second reading is taken with the micrometer 18. By multiplying one-half of the taper per inch, derived from the chart, by three (i.e. the number of inches moved) the required difference between the first and second reading of the micrometer 18 is obtained.

In order to check the radius R (see Fig. 10) at the larger end of the taper 6A, the procedure is the same as previously explained in connection with Figure 5. The value of $$\frac{Y}{2}$$

(see Fig. 10) given by the chart is subtracted from the prescribed radius R.

With the contact ball 12 disposed as indicated in Figure 10 the angle $$\frac{a}{2}$$

can be checked by removing a known length (for example three inches) from the gauge bars 24, 24A. The dial indicator 25 is then set to read zero by adjusting the screw 32, and a second reading is taken on the micrometer 18. One-half of the taper per inch, given by the chart, is multiplied by three (i.e. the number of inches moved) and the result subtracted from the first micrometer reading.

By means of the measuring units illustrated, tapers, plain diameters and radii, and axial dimensions between faces may be accurately measured to 0.00005 inch by direct readings, the "feel" pressure being constant for all readings and governed by the dial indicators 14 and 25.

I claim:

1. A combined taper-measuring machine and linear dimension gauge, comprising a bed fitted with headstocks having centers between which the work-piece to be measured is held, a carriage mounted on balls for movement along the bed parallel to the axis of the centers, a slide supported by the carriage and mounted on balls for horizontal movement at right angles to the axis of the centers, a first contact device provided with a sensitive dial indicator and supported on a mounting adjustably fixed to said slide for movement into and out of contact with said work piece on one side of the axis of the centers, a second contact device removably supported by the axially movable carriage in alignment with said first contact device along a line at right angles to the axis of the centers, and a micrometer comprising two relatively movable elements, together with means through which one of said elements is fixed to said slide with the other of said elements in alignment with said contact devices for adjustment into contact with said second contact device, in which position the sum of the readings of said micrometer and dial indicator is indicative of the distance between said contact devices, and consequently of the diameter of said workpiece when said contact devices are in engagement therewith, said first contact device being adjustable longitudinally along said slide independently of said second contact device and micrometer, and said second contact device being mounted independently of said micrometer, at least one of said contact devices being provided with a portion extending at right angles with respect to the axis of the centers, which may be moved into and out of contact with an end of said workpiece by movement of said carriage along said bed, said bed being provided with a groove parallel to said axis of centers, and length-gauge bars in said groove, said bars at one end engaging said carriage and having their other end positioned for contact with a sensitive dial indicator.

2. A combined taper-measuring machine as claimed in claim 1 and linear dimension gauge in which said second contact device is detachably fixed to said carriage at a predetermined distance from said axis of centres.

3. A combined taper-measuring machine and linear dimension gauge, comprising a bed fitted with headstocks having centres between which the work-piece to be measured is held, a carriage mounted on balls for movement along the bed parallel to the axis of the centres, a slide supported by the carriage and mounted on balls for horizontal movement at right angles to the axis of the centres, a first contact device provided with a sensitive dial indicator and supported on a mounting adjustably fixed to said slide for movement into and out of contact with said workpiece on one side of the axis of the centres, a second contact device removably supported on a mounting which is carried by balls mounted on said slide for horizontal movement along the same line as said first contact device into and out of contact with said workpiece on the opposite side of the axis of the centres, and a micrometer comprising two relatively movable elements, together with means through which one of said elements is fixed to said slide with the other of said elements in alignment with said contact devices for adjustment into contact with said second contact device, in which position the sum of the readings of said micrometer and dial indicator is indicative of the distance between said contact devices, and consequently of the diameter of said workpiece when said contact devices are in engagement therewith, said first contact device being adjustable longitudinally along said slide independently of said second contact device and micrometer, and said second contact device being mounted independently of said micrometer, at least one of said contact devices being provided with a portion extending at right angles with respect to the axis of the centres, which may be moved into and out of contact with an end of said workpiece by movement of said carriage along said bed, said bed being provided with a groove parallel to said axis of centres, and length-gauge bars in said groove, said bars at one end engaging said carriage and having their other end positioned for contact with a sensitive dial indicator.

References Cited in the file of this patent

UNITED STATES PATENTS

| | | |
|---|---|---|
| 1,423,214 | Hill | July 18, 1922 |
| 1,470,836 | Hill | Oct. 16, 1923 |
| 1,480,611 | Hill | Jan. 15, 1924 |
| 1,614,448 | Mensforth | Jan. 11, 1927 |
| 2,158,649 | Armitage | May 16, 1939 |
| 2,378,093 | Monies | June 12, 1945 |
| 2,504,961 | Braaten | Apr. 25, 1950 |
| 2,717,452 | Richardson | Sept. 13, 1955 |
| 2,763,068 | Starbuck | Sept. 18, 1956 |
| 2,763,934 | Creek | Sept. 25, 1956 |
| 2,825,140 | Musser | Mar. 4, 1958 |

FOREIGN PATENTS

| | | |
|---|---|---|
| 390,541 | Germany | Feb. 26, 1924 |